US012763636B2

(12) United States Patent
Ruppert

(10) Patent No.: US 12,763,636 B2
(45) Date of Patent: Oct. 13, 2026

(54) STATOR WITH CONNECTION RING AND CONNECTOR TERMINAL WITH INTERLOCKING STRUCTURES

(71) Applicant: Schaeffler Technologies AG & Co. KG, Herzogenaurach (DE)

(72) Inventor: Andreas Ruppert, Buhlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 368 days.

(21) Appl. No.: 18/265,517

(22) PCT Filed: Oct. 18, 2021

(86) PCT No.: PCT/DE2021/100836
§ 371 (c)(1),
(2) Date: Jun. 6, 2023

(87) PCT Pub. No.: WO2022/122066
PCT Pub. Date: Jun. 16, 2022

(65) Prior Publication Data
US 2023/0378843 A1 Nov. 23, 2023

(30) Foreign Application Priority Data
Dec. 7, 2020 (DE) ......................... 102020132455.3

(51) Int. Cl.
*H02K 3/50* (2006.01)
*H02K 5/22* (2006.01)

(52) U.S. Cl.
CPC ............... *H02K 5/225* (2013.01); *H02K 3/50* (2013.01); *H02K 2203/09* (2013.01)

(58) Field of Classification Search
CPC .. H02K 3/38; H02K 3/50; H02K 3/52; H02K 3/521; H02K 5/225; H02K 11/30; H02K 11/33; H02K 2203/09
See application file for complete search history.

(56) References Cited

U.S. PATENT DOCUMENTS 10,790,719 B2 9/2020 Zahnradfabrik
2008/0017438 A1* 1/2008 Kanda ...................... H02K 3/50 180/443

(Continued)

FOREIGN PATENT DOCUMENTS

CN 208433827 U 1/2019
DE 102008007409 A1 8/2009

(Continued)

OTHER PUBLICATIONS

Cudok, Machine Translation of DE102019207647, Nov. 2020 (Year: 2020).*

*Primary Examiner* — Eric Johnson
(74) *Attorney, Agent, or Firm* — Volpe Koenig

(57) ABSTRACT

A stator for an electric machine having a winding and a connection ring which can be placed axially on the winding and is intended for connecting the winding of the stator. The connection ring has a ring-shaped or ring-segment-shaped plastics body with at least three conductors which are each associated with a phase and are interconnected, and the ends of at least some of the conductors protrude axially beyond the winding. The connection ring has a connector terminal which can be interlockingly connected to the ring and which has at least three electrical connector portions. When the connection ring and the connector terminal are joined together, each contact a conductor of the connection ring that is associated with a phase and each electrically conductively connect to a connector of the connector terminal by the connection ring and the connector terminal having interlocking structure which define a defined position of the connection ring and the connector terminal relative to one another.

18 Claims, 5 Drawing Sheets

(56) References Cited

U.S. PATENT DOCUMENTS

| | | | | |
|---|---|---|---|---|
| 2008/0093945 | A1* | 4/2008 | Gruenhagen | H02K 1/278 310/156.19 |
| 2010/0156208 | A1* | 6/2010 | Schaflein | H02K 7/006 310/71 |
| 2012/0313460 | A1 | 12/2012 | Schaeflein et al. | |
| 2015/0372554 | A1* | 12/2015 | Hashimoto | H02K 3/38 310/71 |

FOREIGN PATENT DOCUMENTS

| | | | |
|---|---|---|---|
| DE | 102011077294 | A1 | 12/2012 |
| DE | 102015208209 | A1 | 11/2016 |
| DE | 102016211230 | A1 | 12/2017 |
| DE | 102018219539 | A1 | 5/2020 |
| DE | 102019202912 | A1 | 9/2020 |
| DE | 102019111825 | A1 | 11/2020 |
| DE | 102019207647 | A1 | 11/2020 |

* cited by examiner

STATOR WITH CONNECTION RING AND CONNECTOR TERMINAL WITH INTERLOCKING STRUCTURES

CROSS-REFERENCE TO RELATED APPLICATIONS

This application is the U.S. National Phase of PCT Appln. No. PCT/DE2021/100836, filed Oct. 18, 2021, which claims the benefit of German Patent Appln. No. 102020132455.3, filed Dec. 7, 2020, the entire disclosures of which are incorporated by reference herein.

TECHNICAL FIELD

The present disclosure relates to a stator for an electric machine, having a winding and a connection ring that can be placed axially on the winding for connecting the winding of the stator, wherein the connection ring is a ring-shaped or ring-segment-shaped plastics body having at least three conductors, each associated with a phase, which are interconnected and the ends of at least some of the conductors protrude axially beyond the winding.

BACKGROUND

Permanently excited synchronous machines (PSM) are already being used in many industrial applications and, as part of the planned full electrification, are also increasingly being used in the automotive industry. Such a permanently excited synchronous machine generally has a stator to be energized and a permanently excited rotor. The stator comprise, among other things, a wire winding, a stator carrier, a connection ring and a connector terminal for the power electronics.

In such an electric machine, the individual windings distributed around the circumference can be connected, for example, via a connection ring or a plurality of connection rings, which can also be designed in the form of ring segments. In this case, busbars usually made of copper can be arranged on or in a common or separate carrier ring made of plastic. Occasionally, connection rings of this type were also referred to as switching rings or contact bridges. Such connection rings are generally placed axially on the winding stack.

DE102008007409A1, for example, describes a three-part switching ring for a stator, wherein three busbars and a star-point ring are arranged in one plane, lying flat next to one another in a carrier ring made of a temperature-resistant plastic. The contact points of the busbars and the star-point ring protrude from the carrier ring and are connected to the wire ends of the partial windings of the stator. This requires a high level of positioning accuracy, precise individual part tolerances, and multiple welding and connection points.

Electric machines having distributed windings or wave windings generally have a wiring area in which various conductors of the winding are connected to one another. This coupling is also known as a bridge, which is usually responsible for reversing the direction of the current flow. Furthermore, the interconnection can also contain what is termed a star-point. At this point, all conductors and currents of the different phases flow together according to a star connection. As a further component, the electric machine has a connector terminal for the HV electronics. This component is responsible for the power supply of the electric machine via the power electronics.

Such connector terminals are known in principle from the prior art. For example, DE 10 2019 111 825 A1 discloses a stator for an electric machine having such a connector terminal.

Although such components are known from the prior art, there is still a desire to optimize them. It is therefore the object of the present disclosure to provide a stator that is improved over the prior art, in particular a stator having a connector terminal that is easy to assemble, which also has a high level of operational reliability even when vibrations occur during operation.

SUMMARY

This object is achieved by a stator for an electric machine, having a winding and a connection ring that can be placed axially on the winding for interconnecting the winding of the stator, wherein the connection ring is a ring-shaped or ring-segment-shaped plastics body having at least three conductors, each associated with a phase, which are interconnected with one another, and the ends of at least some of the conductors protrude axially beyond the winding, wherein the connection ring has a connector terminal which can be interlockingly connected thereto and which has at least three electrical connector portions which, when the connection ring and connector terminal are joined together, each contact a respective conductor of the connection ring that is associated with a phase and each electrically conductively connects to a respective connector of the connector terminal, such that the connection ring and the connector terminal having interlocking means which define a defined position on the connection ring and connector terminal in relation to one another.

This allows the connector terminal to be positioned on the connection ring in an optimized and simplified manner in terms of assembly technology. Furthermore, vibration absorption or decoupling of vibrations between the connector terminal and the connection ring is enabled, which also relieves the weld points between the conductors and the connector portions of the connector terminal.

The individual elements of the present disclosure will first be explained in the order in which they are named in the claims, and particularly preferred embodiments of the subject matter of the disclosure are described below.

Electric machines are used to convert electrical energy into mechanical energy and/or vice versa, and generally include a stationary part referred to as a stator, stand, or armature, and a part referred to as a rotor or runner, and arranged to be movable relative to the stationary part.

In the case of electric machines designed as rotary machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. In connection with the present disclosure, it is preferable to provide the stator for a radial flux machine.

The electric machine is intended in particular for use within a drive train of a hybrid or all-electric motor vehicle. In particular, the electric machine is dimensioned in such a way that vehicle speeds of more than 50 km/h, preferably more than 80 km/h, and in particular more than 100 km/h can be achieved. The electric motor particularly preferably has an output of more than 30 kW, preferably more than 50 kW, and in particular more than 70 kW. Furthermore, it is preferred that the electric machine provides speeds greater than 5,000 rpm, particularly preferably greater than 10,000 rpm, very particularly preferably greater than 12,500 rpm.

The motor housing encloses the electric machine. A motor housing can also accommodate the control and power electronics. The motor housing can furthermore be part of a cooling system for the electric machine, and can be designed in such a way that cooling fluid can be supplied to the electric machine via the housing and/or the heat can be dissipated to the outside via the housing surfaces. In addition, the motor housing protects the electric machine and any electronics that might be present from external influences.

A motor housing can be formed in particular from a metallic material. Advantageously, the motor housing can be formed from a cast metal material, such as gray cast iron or cast steel. In principle, it is also conceivable to form the motor housing entirely or partially from a plastic.

In connection with the present disclosure, it is preferred that the stator is arranged within a motor housing.

The stator of a radial flux machine is usually constructed to be cylindrical and generally consists of electrical laminations that are electrically insulated from one another and are constructed in layers and packaged to form laminated cores. With this design, the eddy currents in the stator caused by the stator field are kept low. Distributed over the circumference, grooves or peripherally closed recesses are embedded into the electrical lamination running parallel to the rotor shaft, and accommodate the stator winding or parts of the stator winding. On the basis of the construction towards the surface, the slots can be closed with locking elements such as locking wedges or covers or the like to prevent the stator winding from being detached.

A connection ring can accommodate one or more busbars which, in particular, can be arranged at a distance from one another and in an electrically insulating manner.

A connection ring can have a circular basic shape with a plurality of circular and concentrically arranged receptacles, such as grooves, in which the corresponding busbars are arranged. A carrier ring is preferably made of a plastic material. In principle, it is conceivable for a connection ring to be designed in one piece or in multiple pieces.

A connection ring can also be embodied merely as a circular ring segment and thus not have a closed circular shape.

According to an advantageous embodiment of the disclosure, it can be provided that the interlocking means comprise a trapezoidal section which extends in the radial direction and which can be inserted into a correspondingly designed pocket. The trapezoidal shape enables the interlocking means to be clearly positioned spatially in relation to one another.

According to a further preferred further development of the disclosure, it can also be provided that the trapezoidal section is formed on the connection ring, in particular the plastics body, and the corresponding pocket is formed on the connector terminal.

Furthermore, according to a likewise advantageous embodiment of the disclosure, it can be provided that the trapezoidal section is located in the radial direction outside the radially outer lateral surface of the ring-shaped connection ring.

According to a further particularly preferred embodiment of the disclosure, it can be provided that the base of the trapezoidal section is arranged radially on the outside. The advantageous effect of this configuration is based on the fact that the ramp of the trapezoidal section, which rises circumferentially in the radial direction, can serve as a support surface for radial forces. In this way, it is also possible for the connector terminal to be self-centering on the connection ring.

Furthermore, the disclosure can also be further developed in such a way that radially outward-pointing spacer elements are formed on the connection ring, on which the connector terminal rests when joined together with the connection ring, wherein the spacer elements are configured in such a way that the connector terminal is radially prestressed with the connection ring.

In a likewise preferred embodiment variant of the disclosure, it can also be provided that the connector terminal has a circular ring-segment-like shape adapted to the connection ring. In this way it can be achieved that a particularly compact combination of connector terminal and connection ring can be formed.

It can also be advantageous to further develop the disclosure in such a way that the connections of the connector terminal extend out thereof in the radial direction.

According to a further preferred embodiment of the subject matter of the disclosure, it can be provided that the connector terminal is produced from a plastic. It is particularly preferred in this connection if the connector portions of the connector terminal are connected to the connector portions by means of busbars, wherein the busbars run on and/or in the plastics body of the connector terminal.

Finally, the disclosure can also be advantageously implemented in such a way that the connector terminal can be plugged onto the connection ring from the axial direction, which is particularly favorable from the point of view of assembly technology.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
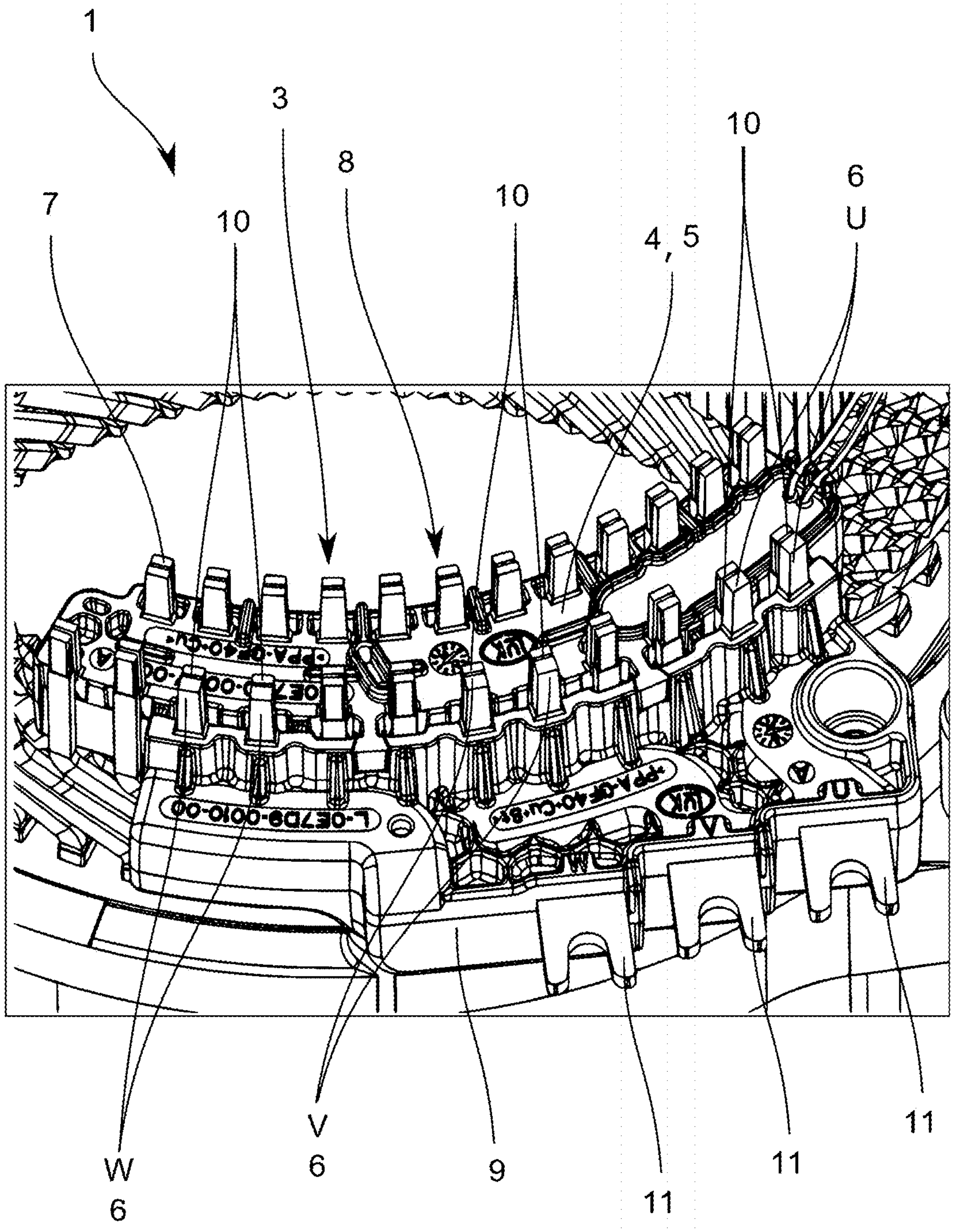
FIG. 1 shows a perspective view of a stator.
Figure 5:
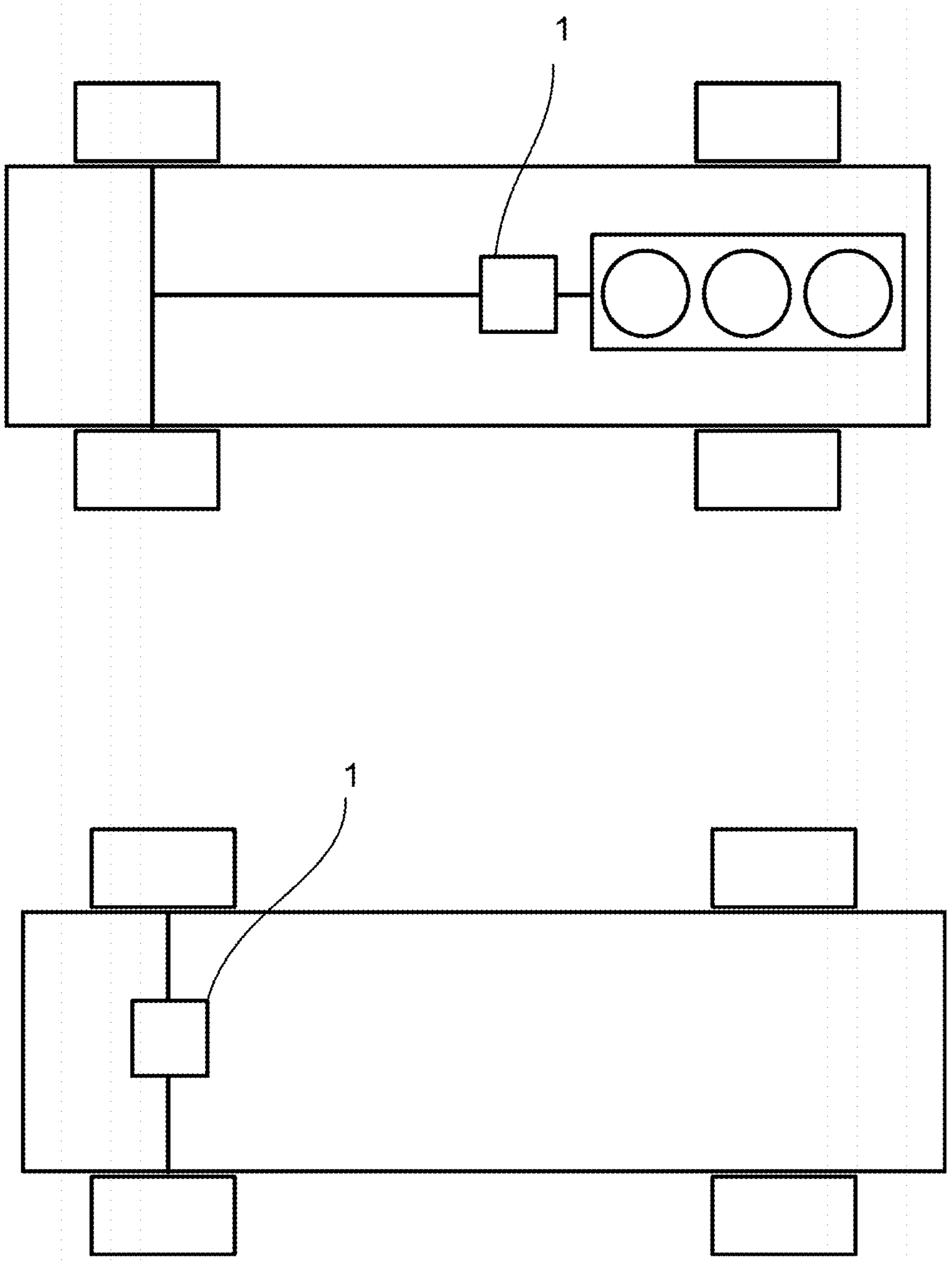
FIG. 5 shows a motor vehicle having an electric machine.

FIG. 1 shows a stator 1 for an electric machine 2, as is used, for example, in an all-electric or hybrid drive train of a motor vehicle, which is shown as an example in FIG. 5.

The electric machine 2 has a winding 3 and a connection ring 4 that can be placed axially onto the winding 3 for connecting the winding 3 of the stator 1. The connection ring 4 comprises a plastics body 5 in the shape of a circular ring segment having at least three conductors 7, each associated with a phase 6, which are interconnected and which penetrate the plastics body 5 in the axial direction so that the ends 8 of at least some of the conductors 7 protrude axially above the winding 3.

The connection ring 4 or the plastics body 5 has a connector terminal 9 that can be interlockingly connected thereto. The connector terminal 9 has three electrical connector portions 10, which protrude from the connector terminal 9 in the axial direction and when the connection ring 4 or plastics body 5 and connector terminal 9 are joined together, each protrudes axially out of the connection ring 4 or plastics body 5 to contact the conductor 7 of the connection ring 4 that is associated with a respective phase 6 and each electrically conductively connects to a respective connector 11 of the connector terminal 9. For this purpose, the connection ring 4 or the plastics body 5 and the connector terminal 9 have interlocking means 12 which define a defined position of the connection ring 4 and connector terminal 9 relative to one another.

Due to the fact that the connector terminal 9 can only be fixed at a precisely defined position on the connection ring 4 or plastics body 5, a correct contacting of the conductors 7 and the electrical connector portions 10 is also always ensured. The connector terminal 9 has a circular ring-shaped segment-like shape adapted to the connection ring 9. The conductors 7 and the connector portions 10 are designed as busbars which protrude axially out of the plastics body 5 and have a rectangular conductor cross-section.

In the embodiment shown in FIG. 1, a winding 3 with hairpin technology or wave technology is shown, which can be connected via a number of weld points, which are not further described. In the embodiment of FIG. 1, the winding 3 has three phases 6 (U,V,W). It goes without saying that, depending on the design of the stator, there can also be more or fewer phases. Each phase is divided into two parallel strands. Depending on the design, the number of phases and parallel strands can differ.

The phase assignment, star connection, and bridge connection can be seen in the embodiment shown in FIG. 1. From this it can be seen that the stator 1 or the electric machine 2 is a star machine. However, it would also be conceivable to design the stator 1 or the electric machine 2 as a delta connection. The connection ring 4 or the plastics body 5 is arranged over the winding head of the winding 3 between the inner and the outer winding layer, and builds up axially thereon.

Figure 2:
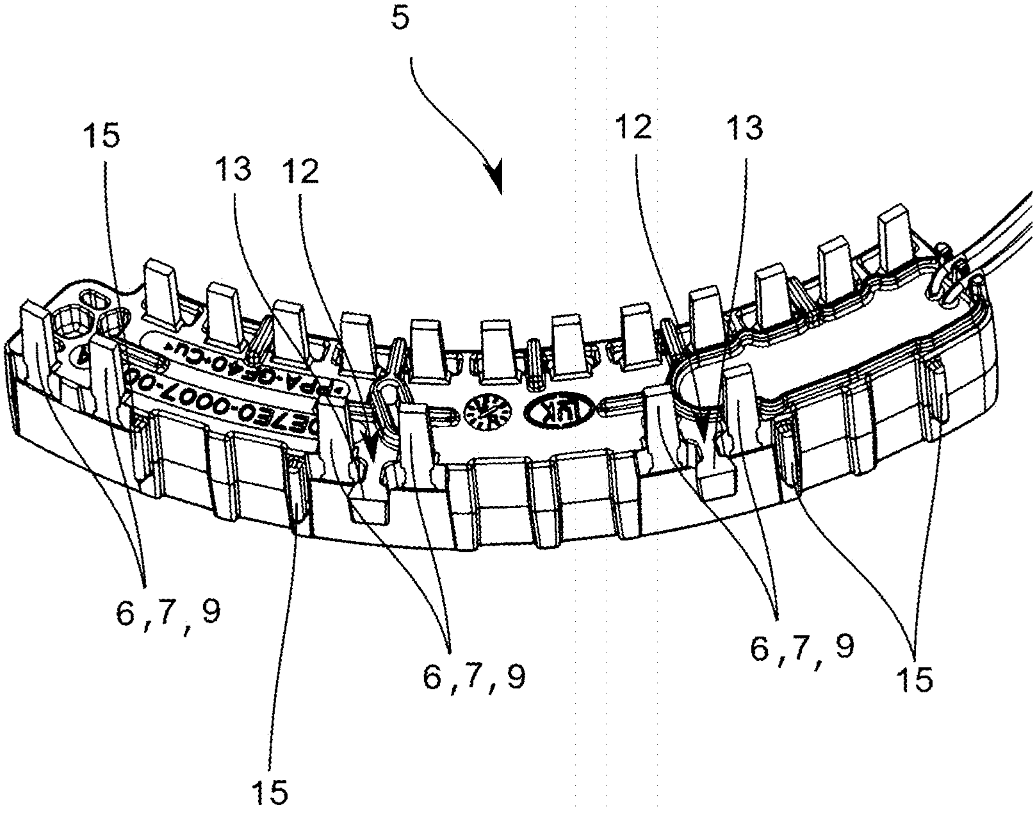
FIG. 2 shows a perspective representation of a ring-segment-shaped plastics body of a connection ring.

The plastics body 5 can be seen in FIG. 2, from which the interlocking means 12 extend in the radial direction. These have a trapezoidal section 13 which can be inserted into a correspondingly designed pocket 14 of the connector terminal 9.

Even if it is shown in the exemplary embodiment shown that the trapezoidal section 13 is formed on the connection ring 4 and the corresponding pocket 14 is formed on the connector terminal 9, it is of course also conceivable that this is formed the other way around, i.e., that the trapezoidal section 13 is formed on the connector terminal 9 and is present in a corresponding pocket 14 on the connection ring 5 or the plastics body 5.

As can be seen by looking at FIG. 1 and FIG. 2 together, the trapezoidal section 13 is located in the radial direction outside the radially outer lateral surface of the ring-shaped connection ring 4 or the plastics body 5, so that the trapezoidal section 13 engages in the pocket 14 of the lateral contour of the connector terminals 9 clinging to plastics body 5.

Figure 3:
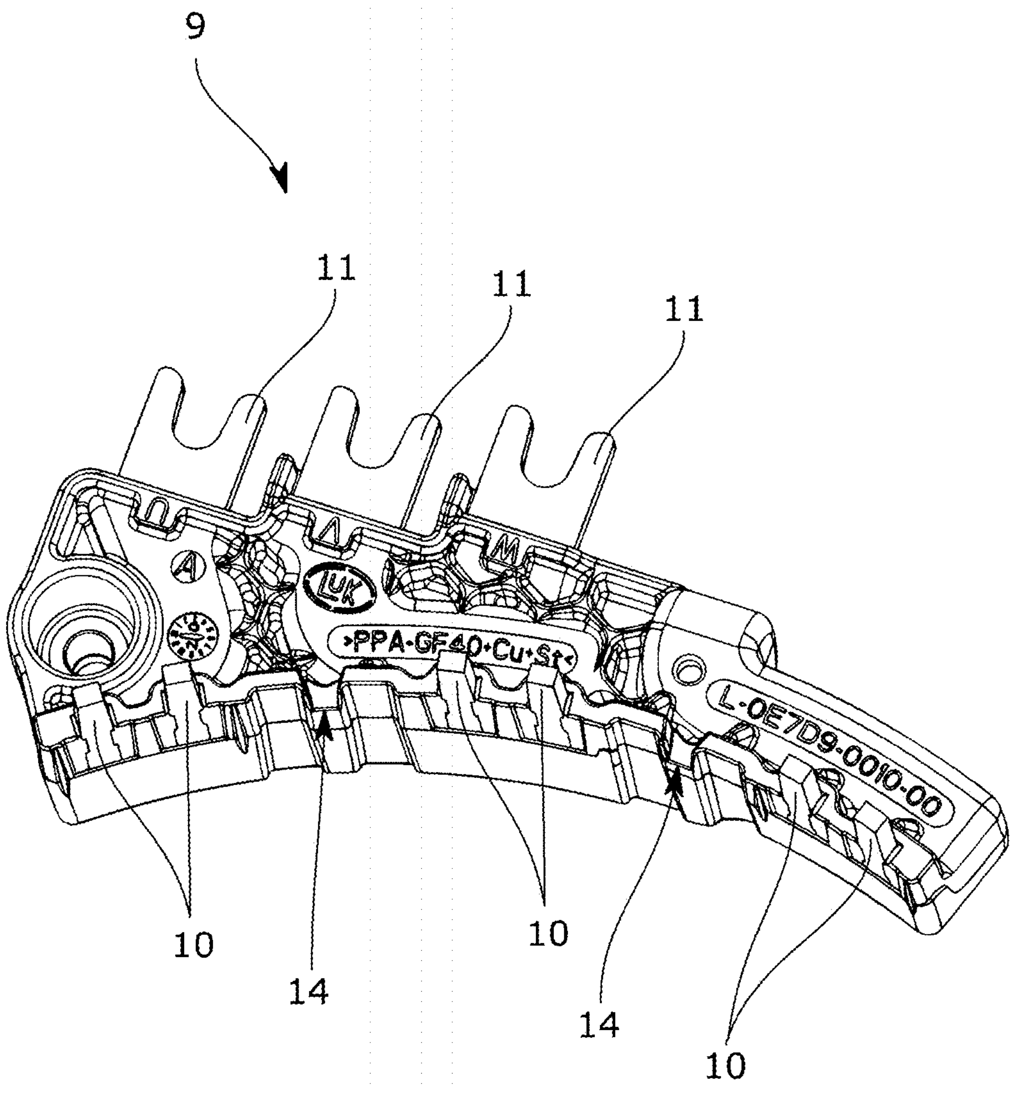
FIG. 3 shows a perspective view of a connector terminal.

The connector terminal 9 is shown in FIG. 3. It can be seen that the pocket 14 forms a stop for the trapezoidal section 13 in the axial direction. It is also shown in FIG. 3 that the connectors 11 of the connector terminal 9 extend out thereof in the radial direction. The connector terminal 9 is made of a plastic.

Figure 4:
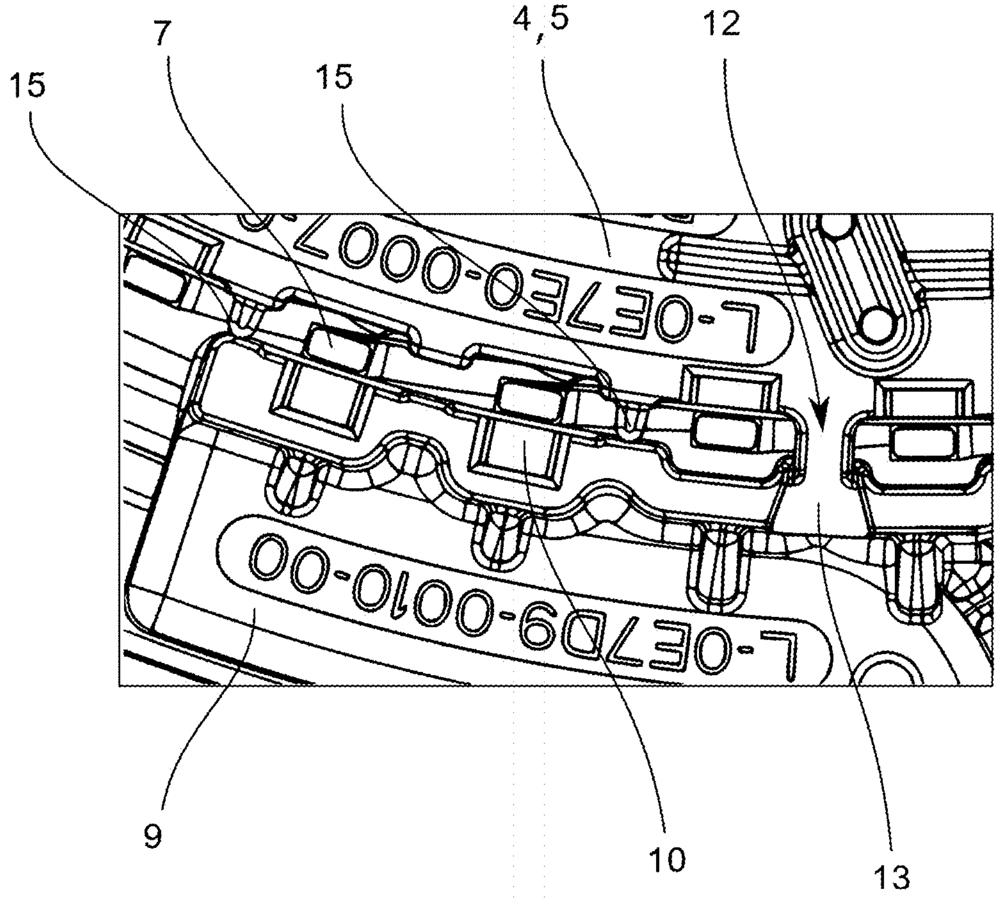
FIG. 4 shows a top view of the interlocking means of the connector terminal connected to one another and of the plastics body in the form of a ring segment.

FIG. 4 shows the interlocking connection of both the connector terminal 9 and plastics body 5 components. It can be seen how the interlocking means 12 engage in one another. Due to the top view, FIG. 4 shows particularly well that the base, i.e., the long side, of the trapezoidal section 13 is arranged radially on the outside. FIG. 4 also shows that spacer elements 15 pointing radially outwards are formed on the connection ring 4, on which the connector terminal 9 rests when joined together with the connection ring 4, wherein the spacer elements 15 are configured in such a way that the connector terminal 9 is joined to the connection ring 4 under a radial prestress.

The function of the wedging of the interlocking means 12 can also be explained in more detail with reference to FIG. 4. The rib-like spacer elements 15 running in the axial direction on the plastics body 5 are coordinated and designed in such a way as to form the contact surfaces for the connector terminal. The connector terminal 9 is thus only in contact with the plastics body 5 via these spacer elements 15. The trapezoidal section 13 of the plastics body 5 is accommodated in the corresponding pocket 14 of the connector terminal 9 in an interlocking manner.

In this context one can also say that the trapezoidal section 13 is designed as a “male connector” and the pocket 14 as a “female connector”. Due to the extension of the spacer element 15 in the radial direction, the contact pressure of the wedging of the interlocking means 12 can be determined and regulated. It can be seen that the greater the radial extent of one of the rib-like spacers 15, the more force is exerted on the pocket-engaging trapezoidal portion 13, and the more the wedging so formed will be intimately engaged.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define ‘first’ and ‘second’ features, this designation serves to distinguish between two features of the same type without defining an order of precedence.

LIST OF REFERENCE SYMBOLS

1 Stator
2 Electric machine
3 Winding
4 Connection ring
5 Plastics body
6 Phase
7 Conductor
8 Ends
9 Connector terminal
10 Connector portion
11 Connection
12 Interlocking means
13 Section
14 Pocket
15 Spacer element

The invention claimed is:

1. A stator for an electric machine comprising:
a winding; and
a connection ring placed axially onto the winding;
the connection ring having a ring-shaped or ring-segment-shaped plastic body having at least three conductors which are each associated with a respective phase and are interconnected, and an end of at least one of the conductors protruding axially above the winding;
wherein the connection ring has a connector terminal having at least three electrical connector portions that each contact a conductor of the connection ring and each electrically conductively connect to a respective connection of the connector terminal, the connection ring and the connector terminal have interlocking structures which define a defined position of the connection ring and connector terminal with respect to one another;

wherein the interlocking structures comprise a trapezoidal section extending in a radial direction and having first and second opposite circumferential end faces and a pocket having a corresponding shape for receiving the trapezoidal section; and wherein the opposite circumferential end faces converge towards each other in a radially inward direction;

wherein the connection ring includes spacer elements pointing radially outwards on which the connector terminal rests when joined together with the connection ring, wherein the spacer elements are configured such that the connector terminal is joined to the connection ring under a radial prestress.

2. The stator according to claim 1, wherein the trapezoidal section is associated with the connection ring, and the pocket is associated with the connector terminal.

3. The stator according to claim 1, wherein the trapezoidal section is located in the radial direction outside a radially outer lateral surface of the ring-shaped connection ring.

4. The stator according to claim 1, wherein a base of the trapezoidal section is arranged radially outward.

5. The stator according to claim 1, wherein the connector terminal has a circular ring-shaped segment-like shape adapted to the connection ring.

6. The stator according to claim 1, wherein the connections of the connector terminal extend out thereof in a radial direction.

7. The stator according to claim 1, wherein the connector terminal is made of a plastic.

8. The stator according to claim 1, wherein the connector terminal can be plugged onto the connection ring from the axial direction.

9. The stator according to claim 1, wherein the first and second opposite circumferential end faces are engaged with respective circumferential end faces of the pocket.

10. A connection ring for a stator of an associated electric machine comprising:

a ring-shaped or ring-segment-shaped plastics body having at least three conductors which are each associated with a respective phase and are interconnected, ends of at least one of the conductors extending in an axial direction;

wherein the connection ring includes a connector terminal having at least three electrical connector portions that each contact a conductor of the connection ring and each electrically conductively connect to a respective connection of the connector terminal, the connection ring and the connector terminal having interlocking structures which define a defined position of the connection ring and connector terminal with respect to one another;

wherein the interlocking structures comprise a trapezoidal section extending in a radial direction and having first and second opposite circumferential end faces and a pocket having a corresponding shape for receiving the trapezoidal section; and wherein the opposite circumferential end faces converge towards each other in a radially inward direction;

wherein the connection ring includes spacer elements pointing radially outwards on which the connector terminal rests, wherein the spacer elements are configured such that the connector terminal is joined to the connection ring under a radial prestress.

11. The connection ring according to claim 10, wherein the connection ring can be placed axially onto a winding of the stator.

12. The connection ring according to claim 10, wherein the trapezoidal section is associated with the connection ring, wherein and the pocket is associated with the connector terminal.

13. The stator according to claim 10, wherein the trapezoidal section is located in the radial direction outside a radially outer lateral surface of the ring-shaped connection ring.

14. The connection ring according to claim 10, wherein a base of the trapezoidal portion is arranged radially outward.

15. The connection ring according to claim 10, wherein the connector terminal has a circular ring-shaped segment-like shape adapted to the connection ring.

16. The connection ring according to claim 10, wherein the connections of the connector terminal extend out thereof in a radial direction.

17. The connection ring according to claim 10, wherein the connector terminal is made of a plastic.

18. The connection ring according to claim 10, wherein the first and second opposite circumferential end faces are engaged with respective circumferential end faces of the pocket.

* * * * *